US008336018B2

(12) United States Patent
Turner et al.

(10) Patent No.: US 8,336,018 B2
(45) Date of Patent: Dec. 18, 2012

(54) POWER GRID OPTIMIZATION

(75) Inventors: Mark F. Turner, Longmont, CO (US);
Jonathan W. Byrn, Fort Collins, CO (US); Jeffrey S. Brown, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 265 days.

(21) Appl. No.: 12/796,906

(22) Filed: Jun. 9, 2010

(65) Prior Publication Data

US 2011/0304052 A1  Dec. 15, 2011

(51) Int. Cl.
G06F 17/50 (2006.01)
(52) U.S. Cl. .................... 716/133; 716/127; 716/129
(58) Field of Classification Search .............. 716/127, 716/129, 133; 257/773
See application file for complete search history.

(56) References Cited

U.S. PATENT DOCUMENTS

| | | | |
|---|---|---|---|
| 6,653,726 B1 | 11/2003 | Schultz et al. | 257/691 |
| 7,129,562 B1 | 10/2006 | Gheewala et al. | 257/574 |
| 7,185,305 B1 | 2/2007 | Rodman | 716/13 |
| 7,240,314 B1 | 7/2007 | Leung | 716/8 |
| 7,246,337 B2 | 7/2007 | Andreev et al. | 716/10 |
| 7,346,869 B2 | 3/2008 | Tai et al. | 716/5 |
| 7,417,328 B2 | 8/2008 | Li et al. | 257/786 |
| 7,847,408 B2 * | 12/2010 | Masleid et al. | 257/773 |
| 2004/0049754 A1 * | 3/2004 | Liao et al. | 716/8 |
| 2006/0239102 A1 | 10/2006 | Saita et al. | 365/226 |
| 2007/0033562 A1 | 2/2007 | Correale, Jr. et al. | 716/10 |
| 2007/0090401 A1 | 4/2007 | Baumann et al. | 257/203 |

OTHER PUBLICATIONS

Su, Haihua, et al., "A Method for the Simultaneous Design of Supply and Signal Networks", IEEE Transactions on Computer-Aided Design of Integrated Circuits and Systems, vol. 23, No. 12, Dec. 2004, pp. 1614-1624.

* cited by examiner

*Primary Examiner* — Vuthe Siek
(74) *Attorney, Agent, or Firm* — Christopher P. Maiorana, PC

(57) ABSTRACT

A global power distribution network in an integrated circuit comprising a first layer of conductive material and a second layer of conductive material. The first layer of conductive material may be (i) coupled to one or more power supplies and (ii) configured to form a plurality of first rails of a mesh. The first rails may (a) supply power to one or more components of a core logic of the integrated circuit, (b) be aligned with a first axis of the integrated circuit, and (c) have one or more parameters configured such that the mesh has a uniform voltage gradient from a perimeter of the integrated circuit to a center of the integrated circuit along the first axis. The second layer of conductive material may be (i) coupled to the one or more power supplies and (ii) configured to form a plurality of second rails of the mesh. The second rails may (a) supply power to one or more components of the core logic, (b) be aligned with a second axis of the integrated circuit, and (c) have one or more parameters configured such that the mesh comprises a uniform voltage gradient from the perimeter of the integrated circuit to the center of the integrated circuit along the second axis.

20 Claims, 7 Drawing Sheets

POWER GRID OPTIMIZATION

FIELD OF THE INVENTION

The present invention relates to integrated circuit design generally and, more particularly, to a method and/or apparatus for implementing optimization of a power grid.

BACKGROUND OF THE INVENTION

Conventional integrated circuit (IC) designs try to deliver power and ground from the package pins to the transistors as efficiently as possible. The power distribution network should have a minimal voltage variation and a high current carrying capability. Space for signal routes is also provided and needs to be connected on the same metal layers as the power distribution network. Using a large amount of metal to form the power distribution network solves the first two goals (i.e., minimal voltage variation and high current carrying capability). However, the solution to the first two goals often comes at the expense of the third goal (i.e., signal routing).

Conventional Place and Route CAD tools use regularly spaced and uniform width power grids. Regularly spaced, uniform width power grids are easy to implement. Regularly spaced, uniform width power grids can use as much or as little metal for power and ground routing as the design dictates. The uniform width and uniform spacing of the metal is chosen to deliver an appropriately low resistance between the power supply and the transistors on the IC.

Local power supply connections need to be consistent because circuits that are placed nearby are much more likely to be communicating with each other. As circuits get closer together, voltage matching between the respective power supplies of the circuits becomes more important. A regular power grid facilitates voltage matching because the regular power grid can provide a smooth voltage gradient without discontinuities. However, pre-routed circuits with pre-routed power grids and power connections only around the perimeter can create discontinuities. The creation of discontinuities is less important if the signal interfaces for the pre-routed circuits are designed to be robust to timing inaccuracy due to power supply voltage levels.

Package pin power and ground placement also has to balance the needs of both the PC Board designer and the IC designer. Compromises are often made due to the package technology chosen. When wire bond packages are used, the power and ground connections come from the edge of the IC and supply power and ground across the whole IC. In flip chip packaging, the power and ground connections can connect more centrally in the die. However, a re-distribution layer still imposes restrictions which can remove symmetry and regularity in the power connections.

The use of a regular power distribution grid on-chip along with irregularly placed point sources (i.e., power and ground IO connections) ensures power and ground voltage irregularities across the die. If the transistors of the IC are modeled as evenly placed power consumers, then an IC using a conventional wire-bond package will have a voltage drop across the middle of the die. The voltage will be held up only at points around the perimeter. The voltage drop can be visualized like a net draping from some points around the edge of the net.

Conventional power and ground routing follows a strict regular grid. However, analysis of the currents in a power mesh (i.e., grid) show that the current increases exponentially from almost zero near the middle of the IC to the highest values right at the power supply IO connection(s). Metal routing on an IC has some amount of resistance. The effects of the resistance of the metal routing cannot be totally eliminated. A large amount of overall voltage drop occurs in the immediate vicinity of the power supply connections because of the higher current.

It would be desirable to have a method and/or apparatus for optimizing a power grid that reduces effects of metal resistance on the power grid.

SUMMARY OF THE INVENTION

The present invention concerns a global power distribution network in an integrated circuit comprising a first layer of conductive material and a second layer of conductive material. The first layer of conductive material may be (i) coupled to one or more power supplies and (ii) configured to form a plurality of first rails of a mesh. The first rails may (a) supply power to one or more components of a core logic of the integrated circuit, (b) be aligned with a first axis of the integrated circuit, and (c) have one or more parameters configured such that the mesh has a uniform voltage gradient from a perimeter of the integrated circuit to a center of the integrated circuit along the first axis. The second layer of conductive material may be (i) coupled to the one or more power supplies and (ii) configured to form a plurality of second rails of the mesh. The second rails may (a) supply power to one or more components of the core logic, (b) be aligned with a second axis of the integrated circuit, and (c) have one or more parameters configured such that the mesh comprises a uniform voltage gradient from the perimeter of the integrated circuit to the center of the integrated circuit along the second axis.

The objects, features and advantages of the present invention include providing a method and/or apparatus for optimizing a global power grid of an integrated circuit that may (i) increase an effective power routing density, (ii) reduce power routing resistance near power supply sources, (iii) take into account that current increases exponentially near the power supply sources, (iv) take into account signal routing criteria in an area where signal routing may be more dense and more routing resources may be needed (e.g., in the middle of an IC rather than near the edges of the IC), (v) take into account maximum current surge needs in each area of the IC, (vi) account for the local power supply voltage drop so that the power supply represents a smooth gradient with minimal discontinuities, (vii) address power supply distribution in terms of metallization density, (viii) use signal routing resources around a periphery of the IC for power distribution, (ix) use partial power supply grids to improve signal routing resources used by automatic place and route tools, (x) provide a systematic description of a best power supply density for minimizing IR (voltage) drop for core logic, (xi) be unrestricted by circuit placement, and/or (xii) alleviate electromigration issues in the power rails by adding wider or more densely spaced power routing where the currents are higher.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
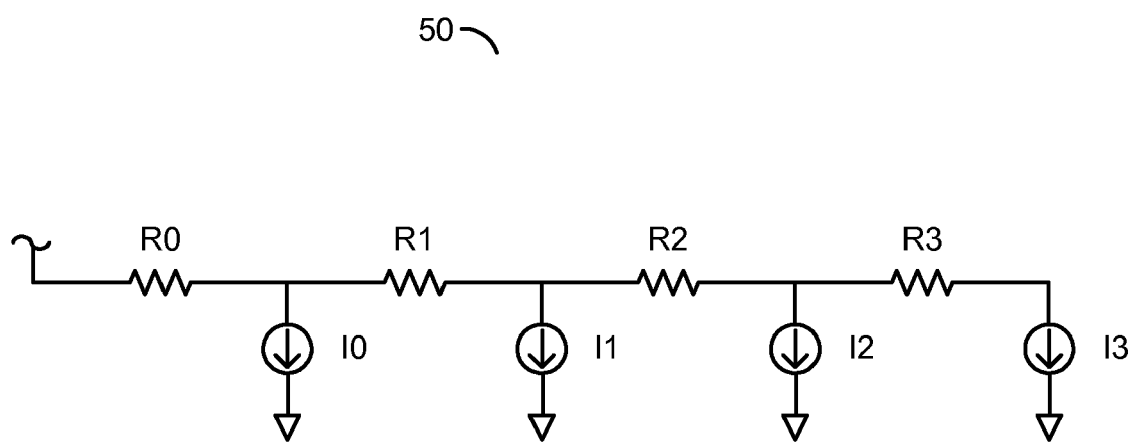
FIG. 1 is a diagram of a general one-dimensional model of an IC power supply.

The present invention generally provides a method for implementing irregularly spaced and/or irregularly sized (e.g., width) power routing to optimize global power supply routing resources supplying power to core logic in an Integrated Circuit (IC). An integrated circuit may also be referred to as a chip or a die. The present invention may balance the conflicting needs of signal routing resources, local and/or global IR drops, and/or flexible pin locations of the IC. Increasing the power supply routing widths in the immediate vicinity of the power supply connections is generally helpful in improving local and global IR drop. In one example, the present invention may provide a systematic description of a best case global power supply density for minimizing global IR (voltage) drop for core logic of the IC. In one example, the systematic description may be provided without costly (e.g., in terms of time and computing power) secondary analysis and without regard to row-based standard cell or gate array circuit placement.

Optimization of global power supply routing in accordance with the present invention is generally unrestricted by circuit placement. The global power supply routing in accordance with the present invention is generally implemented in addition to one or more lower level row-based power supply grids of the integrated circuit. The row-based lower level power supply grids may be configured to accommodate variations in the size and/or placement of particular cells (e.g., standard cells, gate array, etc.) of a particular integrated circuit design. The global power supply routing is generally coupled (e.g., using vias) to the row-based lower level power supply grids. The row-based lower level power supply grids generally transfers power from the global power supply routing to the various components of the core circuitry.

In general, global power supply distribution to the core logic of the IC may be treated in terms of metallization density. The metallization density approach in accordance with the present invention may allow easy development of variable spacing and/or variable width methodologies. The metallization density approach in accordance with the present invention may also allow partial power supply grids that may be discontinuous across the IC. The partial power supply grids may improve signal routing resources used by automated place and route tools in the center of the IC. The partial power supply grids may also take advantage of signal routing resources around a perimeter of the IC for power distribution. However there may be some practical limits to the use of metal for power supply routing. Signals traces may also be connected by the metal routing.

The lower level power supply girds, also referred to as "local power meshes", may be the lowest level or levels of metal that interconnects power and ground between cells in corresponding rows (e.g., a metal 1 layer and/or a metal 2 layer). Many local power mesh designs generally have a regular layout to allow the cells to be placed in evenly-spaced rows. The rows may accommodate automatic power and ground connection just by the placement. Other local power meshes may have more complex layouts to meet the criteria of a particular application.

The global power supply routing, also referred to as "global power meshes", generally comprise all other power routing on the chip. A global power mesh may include, but is not limited to, all metal layers up to and including the uppermost layer used for power and ground. The number of metal layers used in a chip design may vary depending on many factors (e.g., cost, routing density criteria, and the like). Generally, the upper most metal layers may be fabricated thicker than lower metal layers to provide low resistance routing. The top metal levels are generally used extensively for global power routing. The middle metal layers may also be used for considerable global power routing. The global power meshes and the local power meshes are generally connected with stacks of inter-metal layer vias at regular intervals that interconnect all of the power and ground on the IC.

In some implementations, every other layer of metal may have a primary direction (e.g., a horizontal direction or a vertical direction) relative to an edge of the IC. For instance, even-numbered metal layers may be routed primarily vertically whereas odd-numbered layers may be routed horizontally, or vice versa. In some embodiments, if the global routing includes multiple metal layers, the horizontal metal layers may replicate one another and the vertical layers may replicate one another. Via stacks may be placed at regular intervals to interconnect the power traces and the ground traces on different layers. Even if only the uppermost few (e.g., two) layers are used for all global power routing, via stacks may be created from the global power mesh down to the local power routing at regular intervals to interconnect all of the power and ground on the IC.

Referring to FIG. 1, a diagram is shown illustrating an example of a general one-dimensional model of a power supply rail 50. The power supply rail 50 demonstrates the implementation of dense metal routing for the power grid near the power supply. The power supply rail 50 may be modeled as comprising resistors R0-R3 and current sinks I0-I3. A local IR drop through each part of the power supply rail 50 generally increases further from the power supply. Examples of IR drops for a variety of the metal resistances R0-R3 are illustrated in the following TABLE 1:

TABLE 1

| R0 | R1 | R2 | R3 | Total IR μV | Local IR μV |
|----|----|----|----|-------------|-------------|
| 32 | 32 | 32 | 32 | 320 | 128 |
| 8  | 8  | 56 | 56 | 224 | 112 |
| 15 | 20 | 31 | 62 | 244 | 62  |

All three rows of data may represent the same amount of total metal so that the comparisons have a common baseline. The top row of values generally illustrates an example of regular spacing, regular width power rails each having the same resistance value. The middle row of values may illustrate an example of random resistance values. The total IR drop using the random resistance values may be good. However, the local IR drop of the random resistance values may be higher than the top row because of a discontinuity between the R1 and R2 resistances. The bottom row of values generally illustrates an optimized set of resistances. The optimized resistance set may improve the local IR drop considerably while keeping the total IR drop well below the regular spacing/width rows.

The values in the column R0 represent example metal resistances for the resistor R0. The values in the column R1 represent example metal resistances for the resistor R1. The values in the column R2 represent example metal resistances for the resistor R2. The values in the column R3 represent example metal resistances for the resistor R3. The values in the column Total IR µV represent the total IR drop across the power supply rail 50 for the particular values of R0-R3. The values in the column Local IR µV represent the worst variation of Vdd (e.g., highest IR drop) between any two adjacent current sinks (e.g., between I0 and I1, between I1 and I2, between I2 and I3, etc.).

The values for Total IR and Local IR in TABLE 1 illustrate examples where each of the current sinks I0-I3 pulls an equal 1 µA. When the IR drop for each segment of the power supply rail 50 (e.g., resistors R0-R3) is substantially equal, the worst case IR drop may be minimized. For example, the bottom row of values in TABLE 1 illustrates minimization of the worst case IR drop by adjusting segment metal resistance such that each local IR drop is substantially equal to a constant. The top row of values in TABLE 1 represents IR drops for a conventional regularly spaced, uniform width power grid. Comparison of the top row of TABLE 1 with the bottom row of TABLE 1 shows that both the total IR drop as well as the worst IR drop of each local stub may be improved by a power grid implemented in accordance with the present invention. The bottom row generally represents a good compromise among the three rows. The local IR drop in the bottom row may be low so that local performance of the circuits match. Higher and higher local IR drops may eventually result in hold violations in flip-flop scan chains and/or the normal logic circuits.

Holding the IR drop constant for each resistive element may be equivalent to maintaining a constant factor of:

VoltageDrop=current density*length.

The problem of the IR drop may be solved by taking the total current in each power segment to be exponentially increasing with proximity to the power source (e.g., the total current in a segment is exponentially higher for segments closer to the power source).

Figure 2:
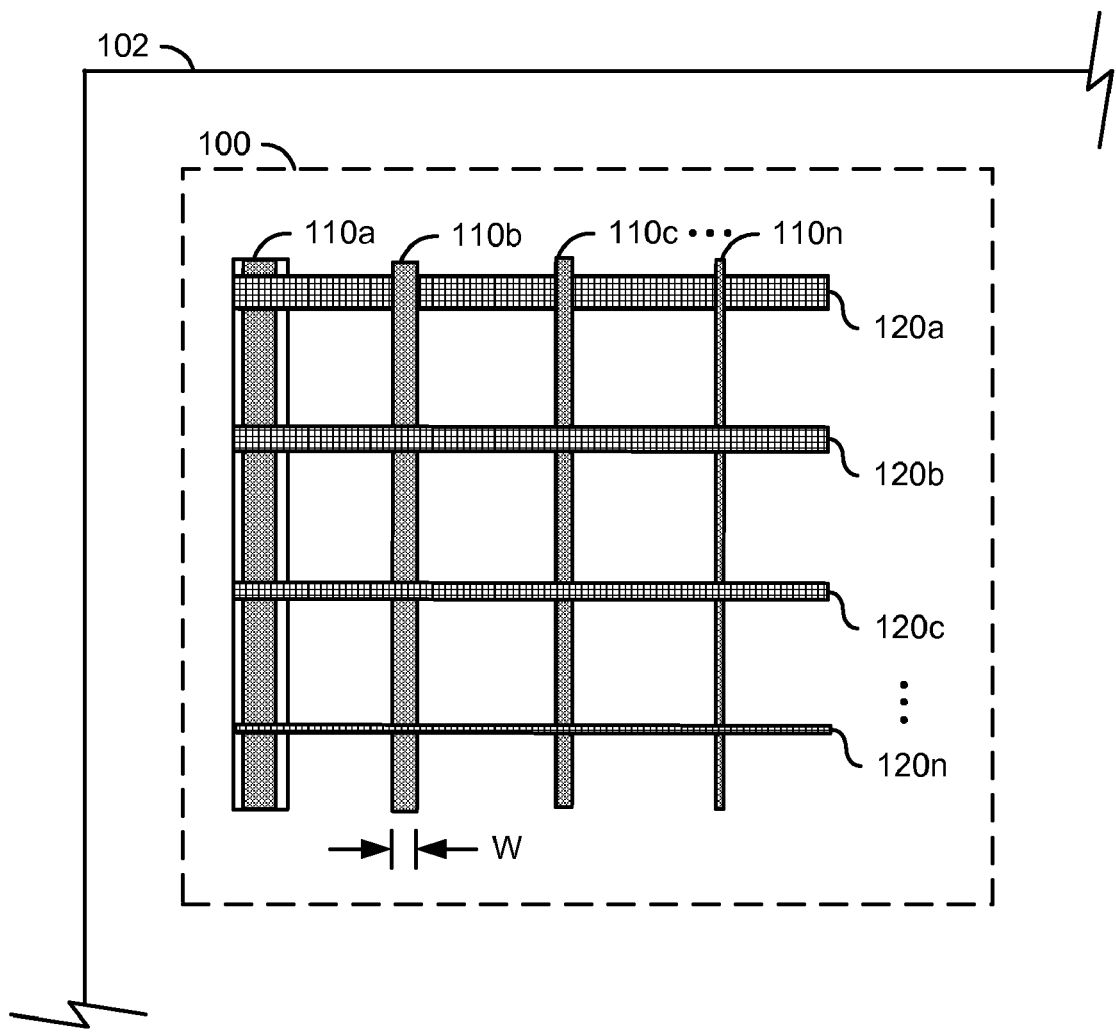
FIG. 2 is a diagram of an example power mesh with power rails of varying width in accordance with an example embodiment of the present invention.

Referring to FIG. 2, a diagram of a power grid 100 of an integrated circuit 102 in accordance with an embodiment of the present invention is shown. The power grid 100 generally implements a global power distribution network for the integrated circuit 102. The power grid 100 may comprise a number of traces (e.g., wires, rails, etc.) 110a-110n, and a number of traces (e.g., wires, rails, etc.) 120a-120n. In one example, the traces 110a-110n may be orthogonal to the traces 120a-120n. The traces 110a-110n may be aligned with a first axis of the circuit 102 (e.g., a vertical axis) and the traces 120a-120n may be aligned with a second axis of the circuit 102 (e.g., a horizontal axis). The traces 110a-110n may comprise conductive material (e.g., metal, Cu, Ag, Au, Al, W, etc.). The traces 110a-110n may be configured as vertical power rails of the circuit 102. The traces 120a-120n may comprise conductive material. The traces 120a-120 may be configured as horizontal power rails of the circuit 102. The vertical power rails 110a-110n and the horizontal power rails 120a-120n may be coupled to one or more power supplies.

In one example, the vertical power rails 110a-110n may be spaced evenly from the outer edge of the circuit 102 to the center of the circuit 102. A width (e.g., W) of each of the vertical power rails 110a-110n may vary depending on a relative position of a particular rail with regard to the center and edge of the circuit 102. In one example, the width of each of the vertical power rails 110a-110n may become smaller towards the center of the circuit 102. For example, the width of the vertical power rail 110a may be larger than the width of the vertical power rail 110b, which may be larger than the width of the vertical power rail 110c, and so on to the thinnest vertical power rail 110n. In general, the vertical power rail with the smallest width may be nearest the center of the circuit 102. However, the particular width of each of the vertical power rails 110a-110n may be varied to meet the design criteria of the particular IC design.

In one example, the horizontal power rails 120a-120n may be spaced evenly from the outer edge of the circuit 102 to the center of the circuit 102. The width of each of the horizontal power rails 120a-120n may vary depending on a relative position of a particular rail with regard to the center and edge of the circuit 102. In one example, the width of each of the horizontal power rails 120a-120n may become smaller towards the center of the circuit 102. For example, the width of the horizontal power rail 120a may be larger than the width of the horizontal power rail 120b, which may be larger than the width of the horizontal power rail 120c, and so on to the thinnest horizontal power rail 120n. In general, the horizontal power rail with the smallest width may be nearest the center of the circuit 102. However, the particular width of each of the horizontal power rails 120a-120n may be varied to meet the design criteria of the particular IC design. The width of the vertical power rails 110a-110n may be similar to or different from the width of the horizontal power rails 120a-120n.

Figure 3:
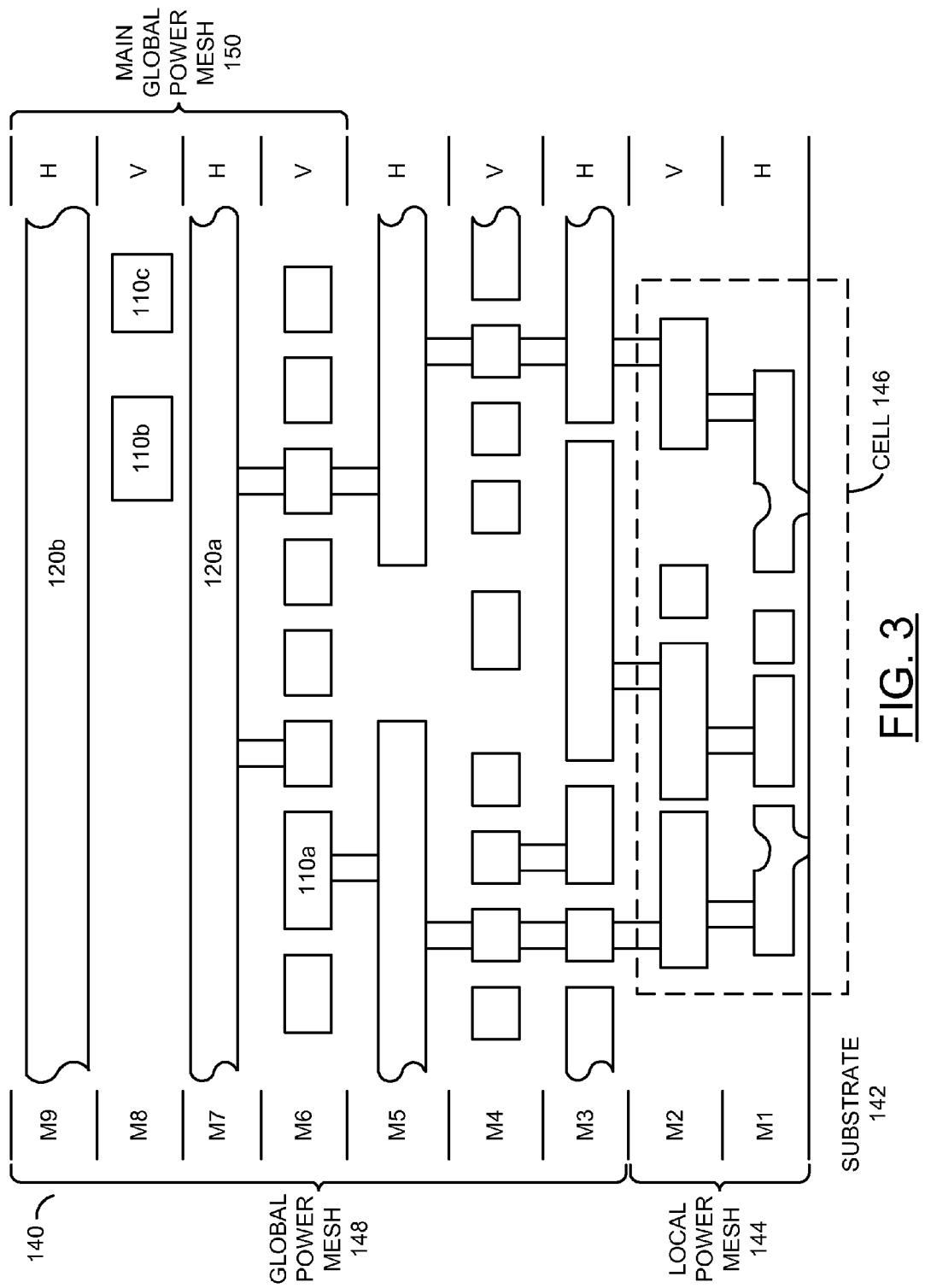
FIG. 3 is a cross-sectional diagram of an example implementation of multiple metal layers.

Referring to FIG. 3, a cross-sectional diagram 140 of an example implementation of multiple metal layers is shown. The diagram 140 generally illustrates multiple metal layers (e.g., M1 to M9) fabricated above a substrate 142. In the example, the odd-numbered metal layers may have a generally horizontal (e.g., left and right across the figure) orientation. The even-numbered metal layers may have a generally vertical (e.g., in and out of the figure) orientation.

A local power mesh 144 generally include the metal layers M1 and M2. The metal layers M1 and M2 may be included in the definition of the library cells (e.g., a cell 146). All metal layers above the cell 146 (e.g., layers M3 to M9) may be part of a global power mesh 148.

The diagram 140 generally illustrates an example of a 7+2 metal stack. The 7+2 metal stack may describe a process that has seven layers of metal (e.g., M1 to M7) at a normal thickness for signal routing. The two top layers of metal (e.g., M8 and M9) in the stack may be fabricated relatively thick for lower resistances of clocks, power, and global signal routing traces.

One or more cell libraries may define the metal layer M1 built into the cells for the local power connections and inter-cell signal routing. The metal layer M2 may also be defined in the cell libraries at regular vertical intervals to complete the local power mesh (or local power grid) and inter-cell signal routing. All metal layers above the metal layer M2 may be used to establish the global power mesh 148. As illustrated, seven metal layers may be interwoven into a power/ground grid. In some embodiments, the lower layers of the global power mesh 148 (e.g., metal layers M3-M5) may either be eliminated (except for the occasional regular via stacks implemented as rectangles of the adjoining metal layers) or reduced in width, to allow for more signal routing resources at the lower levels. For instance, in the example, a compromise might be to use (i) the metal layers M7 and M9 horizontally and (ii) the metal layers M6 and M8 vertically as a main global power mesh 150 (e.g., see FIG. 2). Occasional via stacks may be created in the metal layers M3 to M5 to punch down all the way to the metal layers M1 and M2 in the local power mesh 144.

Figure 4:
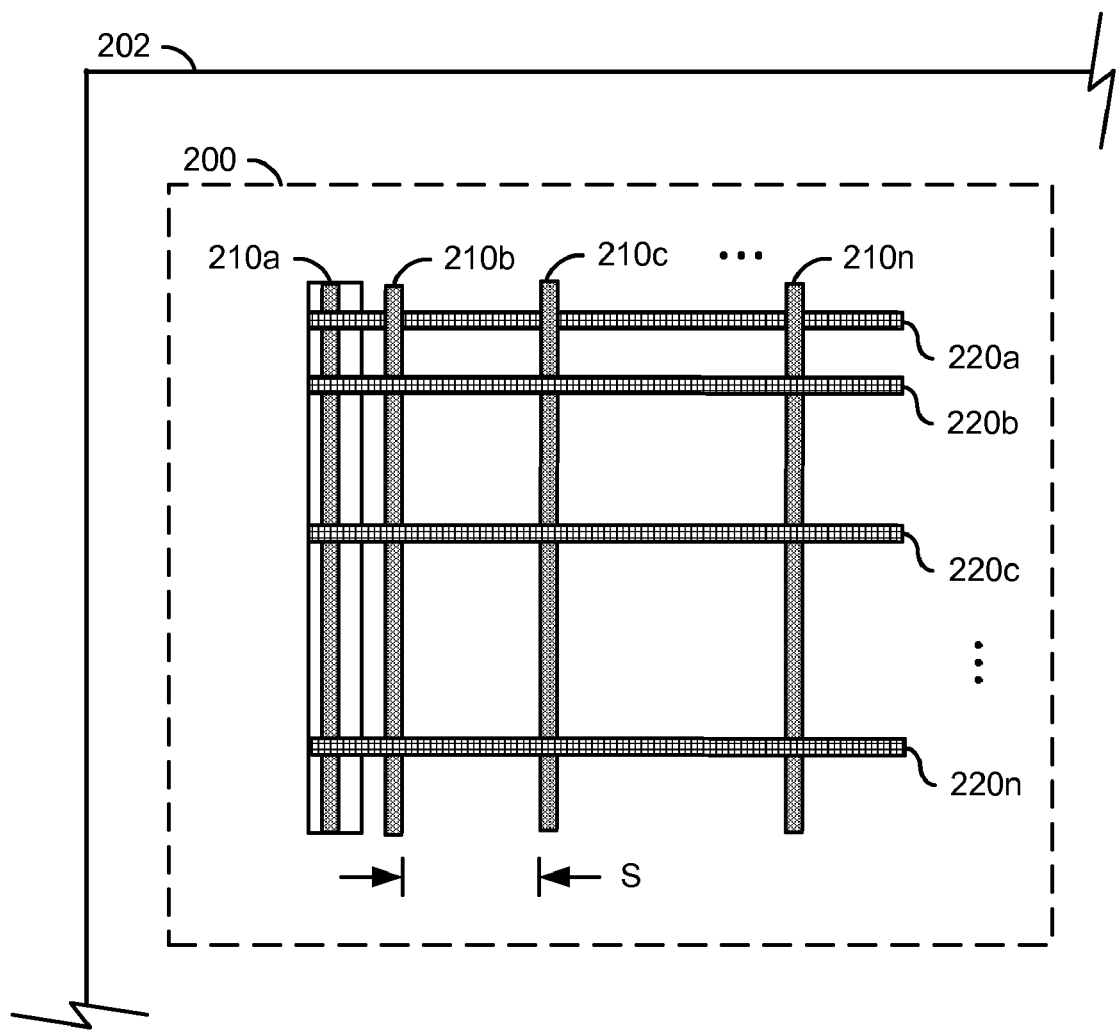
FIG. 4 is a diagram of an example power mesh with power rails having a varied spacing in accordance with another example embodiment of the present invention.

Referring to FIG. 4, a diagram is shown illustrating a global power grid 200 in accordance with an embodiment of the present invention. The grid 200 may implement a global power distribution network for supplying power to core logic of an integrated circuit 202. The grid 200 may comprise a number of traces (e.g., wires, rails, etc.) 210a-210n, and a number of traces (e.g., wires, rails, etc.) 220a-220n. In one example, the traces 210a-210n may be orthogonal to the traces 220a-220n. The traces 210a-210n may be aligned with a first axis (e.g., a vertical axis) of a circuit 202 and the traces 220a-220n may be aligned with a second axis (e.g., a horizontal axis) of the circuit 202. The traces 210a-210n may comprise conductive material configured as vertical power rails of the grid 200. The traces 220a-220n may comprise conductive material configured as horizontal power rails of the grid 200. The vertical power rails 210a-210n and the horizontal power rails 220a-220n may be coupled to one or more power supplies.

A spacing (e.g., S) of the vertical power rails 210a-210n may be varied from the outer edge of the circuit 202 to the center of the circuit 202. In one example, the width of each of the vertical power rails 210a-210n may be uniform. In one example, the space between each of the vertical power rails 210a-210n may increase towards the center of the circuit 202. For example, the spacing between the vertical power rail 210a and the vertical power rail 210b may be less than the spacing between the vertical power rail 210b and the vertical power rail 210c, and so on to the largest spacing between the vertical power rail 210n-1 and the vertical power rail 210n. In general, the largest spacing between the vertical power rails 210a-210n may be nearest the center of the circuit 202. However, the particular spacing between each of the vertical power rails 210a-210n may be varied to meet the design criteria of the particular IC design.

A spacing of the horizontal power rails 220a-220n may be varied from the outer edge of the IC to the center of the IC 202. In one example, the width of each of the horizontal power rails 220a-220n may be uniform. In one example, the space between each of the horizontal power rails 220a-220n may become greater towards the center of the circuit 202. For example, the spacing between the horizontal power rail 220a and the horizontal power rail 220b may be smaller than the spacing between the horizontal power rail 220b and the horizontal power rail 220c, and so on to the greatest spacing between the horizontal power rail 220n-1 and the horizontal power rail 220n. In general, the largest spacing between the horizontal power rails 220a-220n may be nearest the center of the circuit 202. However, the actual spacing between each of the horizontal power rails 220a-220n may be determined by the criteria of the particular IC design. The spacing between the vertical power rails 210a-210n may be similar to or different from the spacing between the horizontal power rails 220a-220n.

Figure 5:
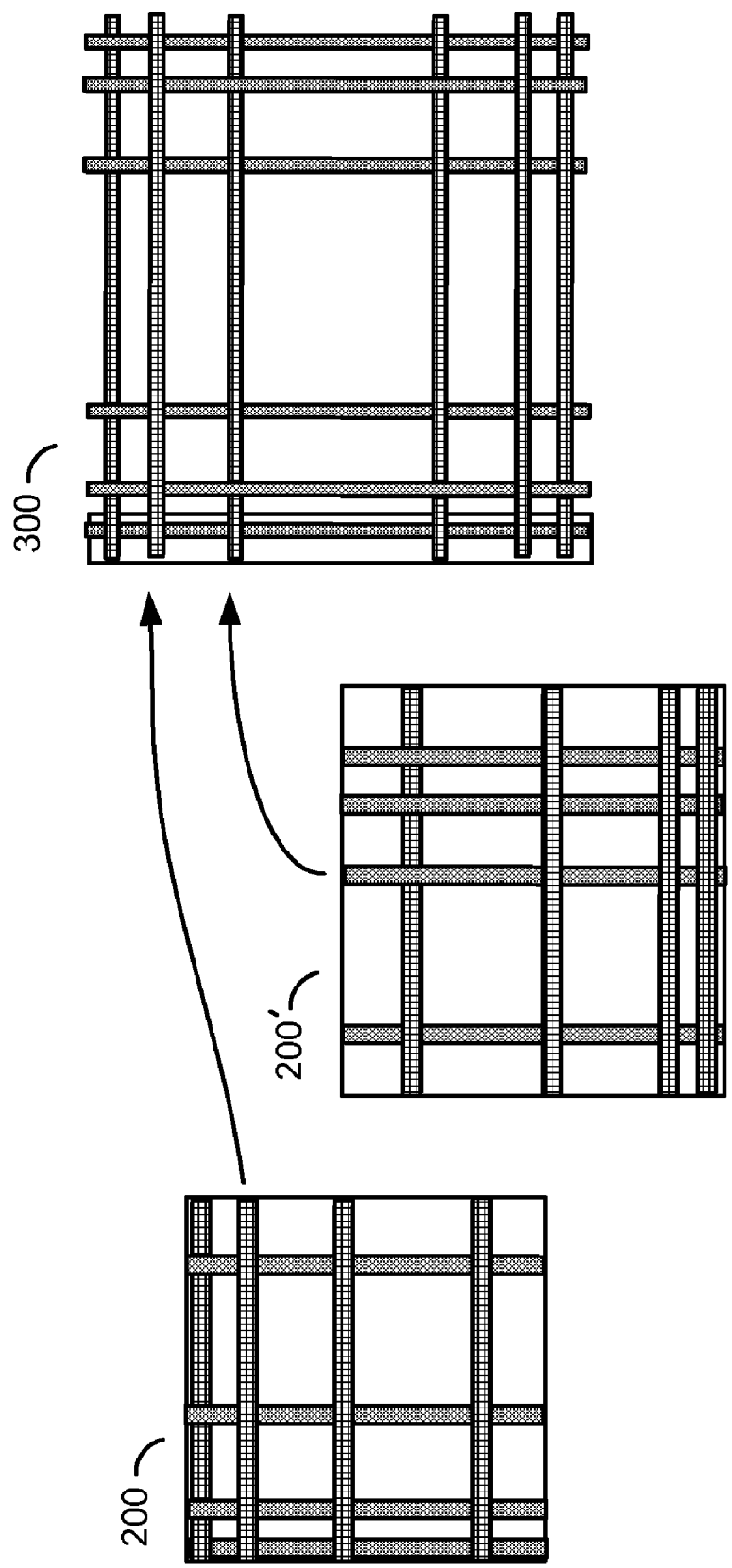
FIG. 5 is a diagram demonstrating superposition of two or more less complex power meshes employing embodiments of the present invention to form a more complex power distribution network.

Referring to FIG. 5, a diagram of a power grid 300 in accordance with an embodiment of the present invention is shown. In the example shown, the power grid 300 comprises a superposition of two or more global power distribution networks (e.g., 200 and 200') employing embodiments of the present invention to form a more complex global power distribution network. The two or more global power distribution networks forming the power grid 300 may comprise power rails of varying width, power rails of varying spacing, and/or power rails with a combination of both varying width and varying spacing. When many sources are available around the edge of an integrated circuit, such as in a wire-bond package, the superposition of the two or more global power distribution networks may simplify the design process. Implementing a global power supply grid using the superposition process generally described herein may provide an advantage of simplifying the overall structure of the irregular grid. As a result, a power or ground pad may be moved later in the layout process without the power grid having to be changed.

Figure 6:
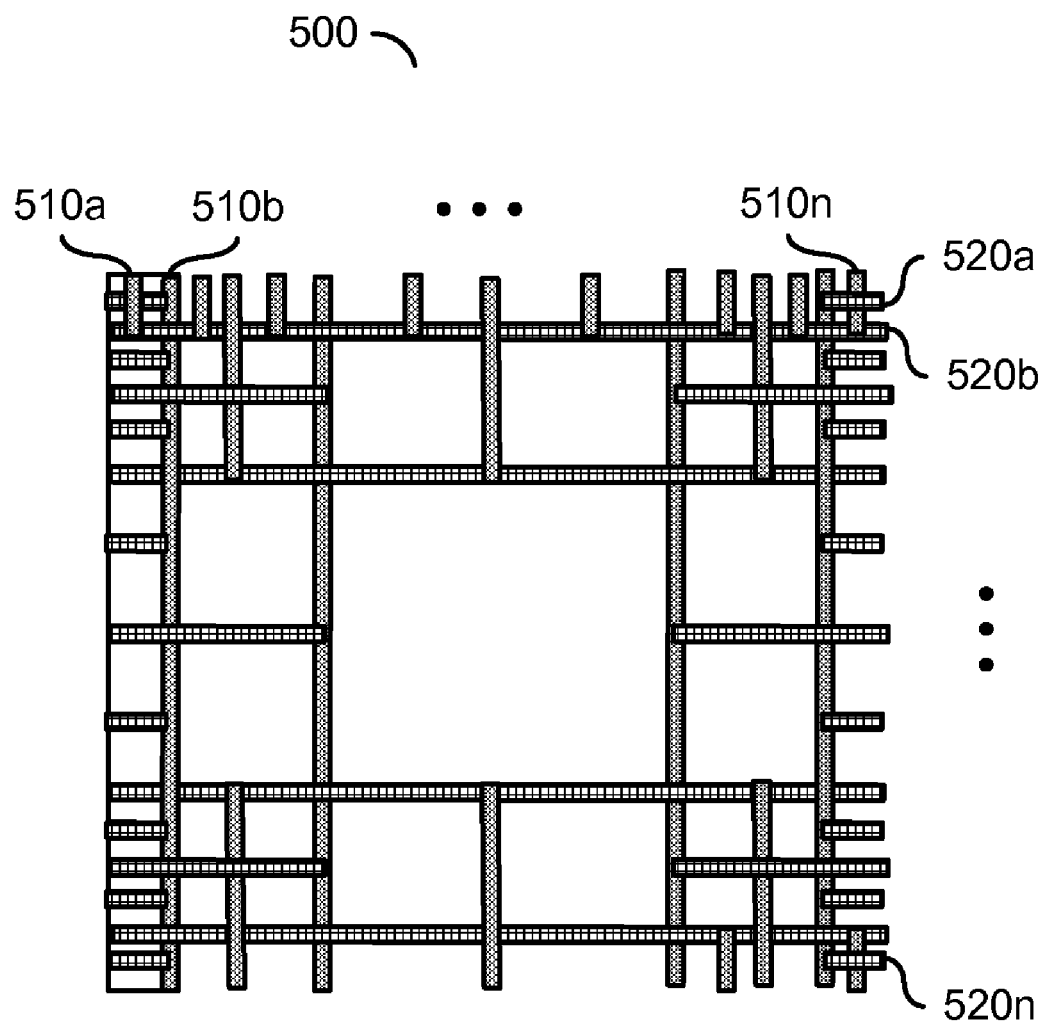
FIG. 6 is a diagram of an example power mesh in accordance with still another example embodiment of the present invention where some of the vertical power rails and/or horizontal power rails of the power mesh do not run across the full surface of the integrated circuit die.

Referring to FIG. 6, a diagram of a power grid 500 is shown in accordance with an embodiment of the present invention. The grid 500 generally comprises a global power distribution network. The grid 500 may comprise a number of traces (e.g., wires, rails, etc.) 510a-510n, and a number of traces (e.g., wires, rails, etc.) 520a-520n. In one example, the traces 510a-510n may be orthogonal to the traces 520a-520n. The traces 510a-510n may be aligned with a first axis of a die (e.g., a vertical axis) and the traces 520a-520n may be aligned with a second axis of the die (e.g., a horizontal axis). The traces 510a-510n may comprise conductive material configured as vertical power rails of the grid 500. The traces 520a-520n may comprise conductive material configured as horizontal power rails of the grid 500. The vertical power rails 510a-510n and the horizontal power rails 520a-520n may be coupled to one or more power supplies.

In one example, the vertical power rails 510a-510n and the horizontal power rails 520a-520n may be implemented having non-uniform width and/or non-uniform spacing. The spacing between and/or the width of the vertical power rails 510a-510n may be similar to or different from the spacing between and/or the width of the horizontal power rails 520a-520n. The vertical power rails 510a-510n may or may not run across the full surface of the die of the IC. The horizontal power rails 520a-520n may or may not run across the full surface of the die of the IC. For example, the grid 500 may comprise power rails of varying lengths. The power rails 510a-510n and/or 520a-520n may not all be routed across the full die surface. Some of the vertical power rails 510a-510n may run all the way across the die surface (e.g., 510b). Other vertical power rails (e.g., 510a, 510n, etc.) may run only a specified distance across the die and may not run all the way across the die. Some of the horizontal power rails 520a-520n may run all the way across the die surface (e.g., 520b). Other horizontal power rails (e.g., 520a, 520n, etc.) may run only a specified distance across the die and may not run all the way across the die. The vertical power rails 510a-510n and the horizontal power rails 520a-520n which do not run all the way across the surface of the die may be referred to as stubs. Stubs may also be useful tools for varying the density of a power grid.

The grid 500 may further accommodate certain IC designs by customizing signal routing and power supply distribution for specific applications. Specific cell placements may be accommodated based on the customized power distribution network comprising one or more stubs and/or power rails.

Figure 7:
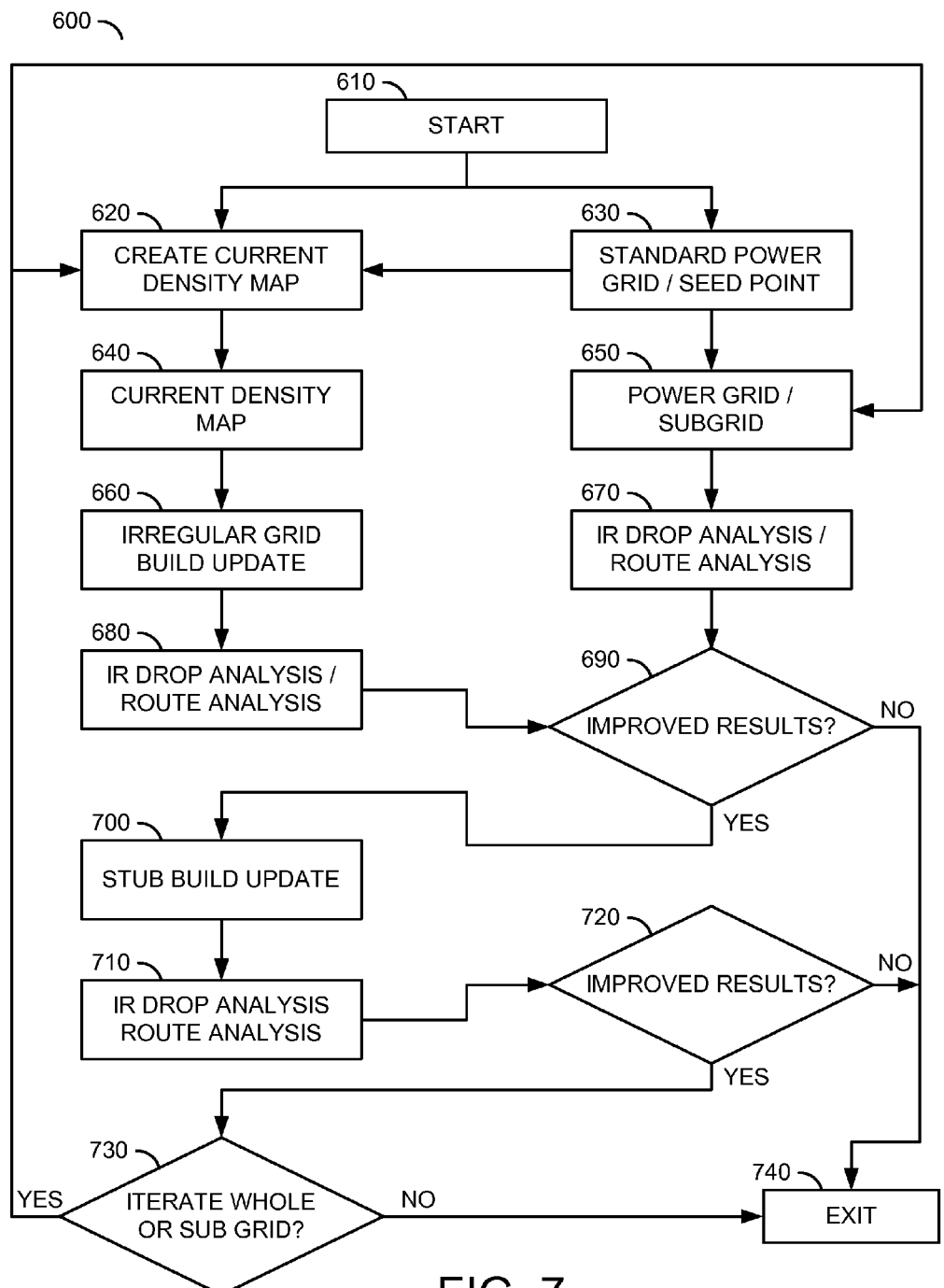
FIG. 7 is a flow chart of a method of optimizing a power grid for an integrated circuit in accordance with yet another embodiment of the present invention.

Referring to FIG. 7, a flow diagram is shown illustrating an example process (or method) 600 in accordance with the present invention. The process 600 generally comprises a step (or state) 610, a step (or state) 620, a step (or state) 630, a step (or state) 640, a step (or state) 650, a step (or state) 660, a step (or state) 670, a step (or state) 680, a step (or state) 690, a step (or state) 700, a step (or state) 710, a step (or state) 720, a step (or state) 730, and a step (or state) 740.

The step 610 may comprise a starting point of the process 600. The step 620 may comprise creating a current density map for an IC. The step 630 may comprise generating a conventional power grid (or seed point) for a power grid for an IC. The step 640 may comprise selecting the current density map generated in step 620. The step 650 may comprise selecting the power grid generated in step 630. The step 660 may comprise generating and/or updating an irregular power grid in accordance with the present invention. The step 670 may comprise generating an IR drop and/or route analysis of the power grid from step 650. The step 680 may comprise generating an IR drop and/or route analysis of the irregular power grid from step 660. The step 690 may comprise a decision step for comparing the power grids and analysis from the steps 620-680 to determine which power grid may be more efficient. If the step 690 determines that a more efficient power grid may be generated, then the process 600 continues with the step 700. Otherwise, the process 600 terminates at the step 740.

The step 700 may comprise generating a power grid that further comprises power stubs (e.g., vertical and/or horizontal power rails that do not run across the entire surface of the die). The step 710 may comprise generating an IR drop and/or route analysis of the power grid generated in the step 700. The step 720 may comprise a decision step for comparing the power grids and analysis from the steps 620-680 and the steps 700-710 to determine which power grid may be more efficient. If the step 720 determines that a more efficient power grid may be generated, then the process 600 continues with the step 730. Otherwise, the process 600 terminates at the step 740. The step 730 may comprise a decision step for determining whether to iterate a whole power grid or a sub power grid. If the step 730 determines to iterate a whole power grid, then the process 600 continues with the step 620 and the step 650. Otherwise, the process 600 terminates at the step 740. The step 740 may comprise a termination point for exiting the process 600.

The present invention may provide advantages that may include increasing the effective power routing density and reducing the power routing resistance. The present invention also may take into account the needs of signal routing in the area where signal routing may be more dense and more routing resources may be needed (e.g., in the middle of an IC rather than near the IC edges). The present invention may also take into account the maximum current surge needs in each area of the IC by customizing the width and/or the spacing of the power rails. The present invention may further take into account the local power supply voltage drop so that the power supply presents a smooth gradient with minimal discontinuities across the IC. The present invention may also alleviate electro-migration issues in the power rails by adding wider or more densely spaced power routing where the currents are higher.

The power grid optimization methodology of the present invention may also accommodate more signal routing in the center of the IC. In general, any cell that may be placed near an edge has a greater probability of communicating with another cell towards the middle of the IC than in any other direction. As a result, more signal routing resources may be utilized in the middle of an IC than near the edges. Reducing the variation between tap points may also have the advantage of reducing power supply variation between communicating blocks of logic.

Implementing a variable density power grid in accordance with the present invention using common Place and Route CAD tools may use some knowledge of how the tools generate power grids. Most tools allow a designer to specify a width and a spacing for which to repeat a common regular power grid. In most cases, the spacing and/or width may be manipulated to allow the placement of variable width or variable spaced power rails (or a combination of both variable width and variable spaced power rails) as shown in FIGS. 2 and 4. The present invention may also provide a methodology to develop a systematic description of an optimized power supply density for minimizing IR drop for core logic while minimizing costly secondary analysis.

The functions performed by the diagram of FIG. 7 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A global power distribution network in an integrated circuit comprising:
a first layer of conductive material (i) coupled to one or more power supplies and (ii) configured to form a plurality of first rails of a mesh, wherein said first rails (a) supply power to one or more components of a core logic of said integrated circuit, (b) are aligned with a first axis of said integrated circuit, and (c) have one or more parameters configured such that said mesh has a uniform voltage gradient from a perimeter of the integrated circuit to a center of the integrated circuit along said first axis; and
a second layer of conductive material (i) coupled to said power supplies and (ii) configured to form a plurality of second rails of the mesh, wherein said second rails (a) supply said power to said components of said core logic, (b) are aligned with a second axis of said integrated circuit, (c) have one or more parameters configured such that said mesh comprises another uniform voltage gradient from said perimeter of the integrated circuit to said center of the integrated circuit along said second axis, (d) said parameters of said first rails comprise a width of each of said first rails and (e) said width of each of said first rails becomes thinner as said first rails are positioned closer to said center of said integrated circuit such that said first rail located nearest said center of said integrated circuit has a thinnest width and said first rail nearest said perimeter of said integrated circuit has a thickest width.

2. The global power distribution network of claim 1, wherein (i) said parameters of said second rails comprise another width of each of said second rails and (ii) said another width of each of said second rails becomes thinner as the second rails are positioned closer to the center of said integrated circuit such that the second rail located nearest the center of the integrated circuit has the thinnest width and the second rail nearest the perimeter of the integrated circuit has the thickest width.

3. The global power distribution network of claim 1, wherein (i) said parameters of said second rails comprise a space between each of said second rails and (ii) said space between each of said second rails becomes larger towards the center of said integrated circuit such that the second rails located nearest the center of the integrated circuit have a largest space between the second rails and the second rails nearest the perimeter of the integrated circuit have a least space between the second rails.

4. The global power distribution network of claim 1, wherein said one or more parameters comprise a metallization density of said plurality of first rails, said plurality of second rails, or a combination of said plurality of first rails and said plurality of second rails.

5. The global power distribution network of claim 1, wherein said global power distribution network is coupled to a row-based lower level power supply grid of said integrated circuit.

6. The global power distribution network of claim 1, wherein (i) said first rails have a non-uniform spacing, a non-uniform width or both a non-uniform spacing and a non-uniform width, (ii) said second rails have a non-uniform spacing, a non-uniform width or both a non-uniform spacing and a non-uniform width, (iii) one or more of said first rails do not run across a full surface of the integrated circuit, and (iv) one or more of said second rails do not run across the full surface of the integrated circuit.

7. A global power distribution network in an integrated circuit comprising:
a first layer of conductive material (i) coupled to one or more power supplies and (ii) configured to form a plurality of first rails of a mesh, wherein said first rails (a) supply power to one or more components of a core logic of said integrated circuit, (b) are aligned with a first axis of said integrated circuit, and (c) have one or more parameters configured such that said mesh has a uniform voltage gradient from a perimeter of said integrated circuit to a center of said integrated circuit along said first axis; and
a second layer of conductive material (i) coupled to said one or more power supplies and (ii) configured to form a plurality of second rails of said mesh, wherein said second rails (a) supply said power to said components of said core logic, (b) are aligned with a second axis of said integrated circuit, (c) have one or more parameters configured such that said mesh comprises another uniform voltage gradient from said perimeter of said integrated circuit to said center of said integrated circuit along said second axis, (d) said parameters of said first rails comprise a space between each of said first rails and (e) said space between each of said first rails becomes larger towards the center of said integrated circuit such that the first rails located nearest the center of the integrated circuit have a largest space between the first rails and the first rails nearest the perimeter of the integrated circuit have a least space between the first rails.

8. The global power distribution network of claim 7, wherein (i) said parameters of said first rails further comprise a width of each of said first rails, (ii) said width of each of said first rails becomes thinner as the first rails are positioned closer to the center of the integrated circuit such that the first rail located nearest the center of the integrated circuit has a thinnest width and the first rail nearest the perimeter of the integrated circuit has a thickest width.

9. A method for designing a global power distribution network in an integrated circuit comprising:
(A) designing using a computer a first layer of conductive material (i) coupled to one or more power supplies, and (ii) configured to form a plurality of first rails of a mesh, wherein said first rails (a) supply power to one or more components of a core logic of said integrated circuit and (b) are aligned with a first axis of said integrated circuit;
(B) designing a second layer of conductive material (i) coupled to said power supplies, and (ii) configured to form a plurality of second rails of said mesh, wherein said second rails (a) supply said power to said components of said core logic and (b) are aligned with a second axis of said integrated circuit; and
(C) modifying one or more parameters of (i) said first rails, (ii) said second rails, (iii) or a combination of said first rails and said second rails, such that said mesh has a uniform voltage gradient from a perimeter of the integrated circuit to a center of the integrated circuit along said first axis, said second axis or both said first axis and said second axis, wherein (i) said parameters of said first rails comprise a width of each of said first rails and (ii) said width of each of said first rails becomes thinner as said first rails are positioned closer to said center of said integrated circuit such that said first rail nearest said center of said integrated circuit has a thinnest width and said first rail nearest said perimeter of said integrated circuit has a thickest width.

10. The method of claim 9, wherein (i) said parameters of said second rails comprise another width of each of said second rails and (ii) said another width of each of said second rails becomes thinner as the second rails are positioned closer to the center of said integrated circuit such that the second rail located nearest the center of the integrated circuit has the thinnest width and the second rail nearest the perimeter of the integrated circuit has the thickest width.

11. The method of claim 9, wherein (i) said parameters of said second rails further comprise a space between each of said second rails and (ii) said space between each of said second rails becomes larger towards the center of said integrated circuit such that the second rails nearest the center of the integrated circuit have a largest space between said second rails and the second rails nearest the perimeter of the integrated circuit have a least space between the second rails.

12. The method of claim 9, wherein said one or more parameters comprise a metallization density of said plurality of first rails, said plurality of second rails, or a combination of said plurality of first rails and said plurality of second rails.

13. The method of claim 9, wherein said one or more parameters of said plurality of first rails, said plurality of second rails, or a combination of said plurality of first rails and said plurality of second rails are modified to minimize a worst case local power supply voltage drop.

14. The method of claim 9, where said method further comprises:
(D) superimposing two or more of said meshes together to create a combined mesh, wherein each of the one or more parameters from each of the meshes is modified to improve the combined mesh.

15. The method of claim 9, wherein (i) said first rails have a non-uniform spacing, a non-uniform width or both a non-uniform spacing and a non-uniform width, (ii) said second rails have a non-uniform spacing, a non-uniform width or both a non-uniform spacing and a non-uniform width, (iii) one or more of said first rails do not run across a full surface of the integrated circuit, and (iv) one or more of said second rails do not run across the full surface of the integrated circuit.

16. A method for optimizing a global power distribution network in an integrated circuit comprising:
(A) designing using a computer a first layer of conductive material (i) coupled to one or more power supplies, and (ii) configured to form a plurality of first rails of a mesh, wherein said first rails (a) supply power to one or more components of a core logic of said integrated circuit and (b) are aligned with a first axis of said integrated circuit;
(B) designing a second layer of conductive material (i) coupled to said power supplies, and (ii) configured to form a plurality of second rails of said mesh, wherein said second rails (a) supply said power to said components of said core logic and (b) are aligned with a second axis of said integrated circuit; and
(C) modifying one or more parameters of (i) said first rails, (ii) said second rails, (iii) or a combination of said first rails and said second rails, such that said mesh has a uniform voltage gradient from a perimeter of said integrated circuit to a center of said integrated circuit along said first axis, said second axis or both said first axis and said second axis, wherein (i) said parameters of said first rails comprise a space between each of said first rails and (ii) said space between each of said first rails becomes larger towards the center of said integrated circuit such that the first rails located nearest the center of the integrated circuit have a largest space between said first rails and the first rails nearest the perimeter of the integrated circuit have a least space between the first rails.

17. The method of claim 16, wherein (i) said parameters of said first rails further comprise a width of each of said first rails and (ii) said width of each of said first rails becomes thinner as the first rails are positioned closer to the center of the integrated circuit such that said first rail nearest the center of the integrated circuit has a thinnest width and the first rail nearest the perimeter of the integrated circuit has a thickest width.

18. The method of claim 16, wherein (i) said parameters of said second rails comprise a width of each of said second rails and (ii) said width of each of said second rails becomes thinner as the second rails are positioned closer to the center of said integrated circuit such that the second rail located nearest the center of the integrated circuit has a thinnest width and the second rail located nearest the perimeter of the integrated circuit has a thickest width.

19. A design tool comprising computer executable instructions stored on a non transitory computer readable storage medium configured to cause a computer to perform the steps of:
(A) receiving user input defining one or more parameters of a first layer of conductive material, said first layer of conductive material (i) being coupled to one or more power supplies and (ii) configured to form a plurality of first rails of a mesh, wherein said first rails (a) supply power to one or more components of a core logic of an integrated circuit and (b) are aligned with a first axis of said integrated circuit;
(B) receiving user input defining one or more parameters of a second layer of conductive material, said second layer of conductive material (i) being coupled to said power supplies and (ii) configured to form a plurality of second rails of said mesh, wherein said second rails (a) supply said power to said components of said core logic and (b) are aligned with a second axis of said integrated circuit; and
(C) modifying said parameters of (i) said first rails, (ii) said second rails, (iii) or a combination of said first rails and said second rails, based upon said user input such that said mesh comprises a uniform voltage gradient from a perimeter of the integrated circuit to a center of the integrated circuit along said first axis, said second axis, or both said first axis and said second axis, wherein (i) said parameters of said second rails comprise a width of each of said second rails and (ii) said width of each of said second rails becomes thinner as said second rails are positioned closer to said center of said integrated circuit such that said second rail located nearest said center of said integrated circuit has a thinnest width and said second rail located nearest said perimeter of said integrated circuit has a thickest width.

20. The design tool of claim 19, wherein (i) said parameters of said first rails further comprise another width of each of said first rails and (ii) said another width of each of said first rails becomes thinner as the first rails are positioned closer to the center of the integrated circuit such that the first rail located nearest the center of the integrated circuit has the thinnest width and the first rail nearest the perimeter of the integrated circuit has the thickest width.

* * * * *